UNITED STATES PATENT OFFICE.

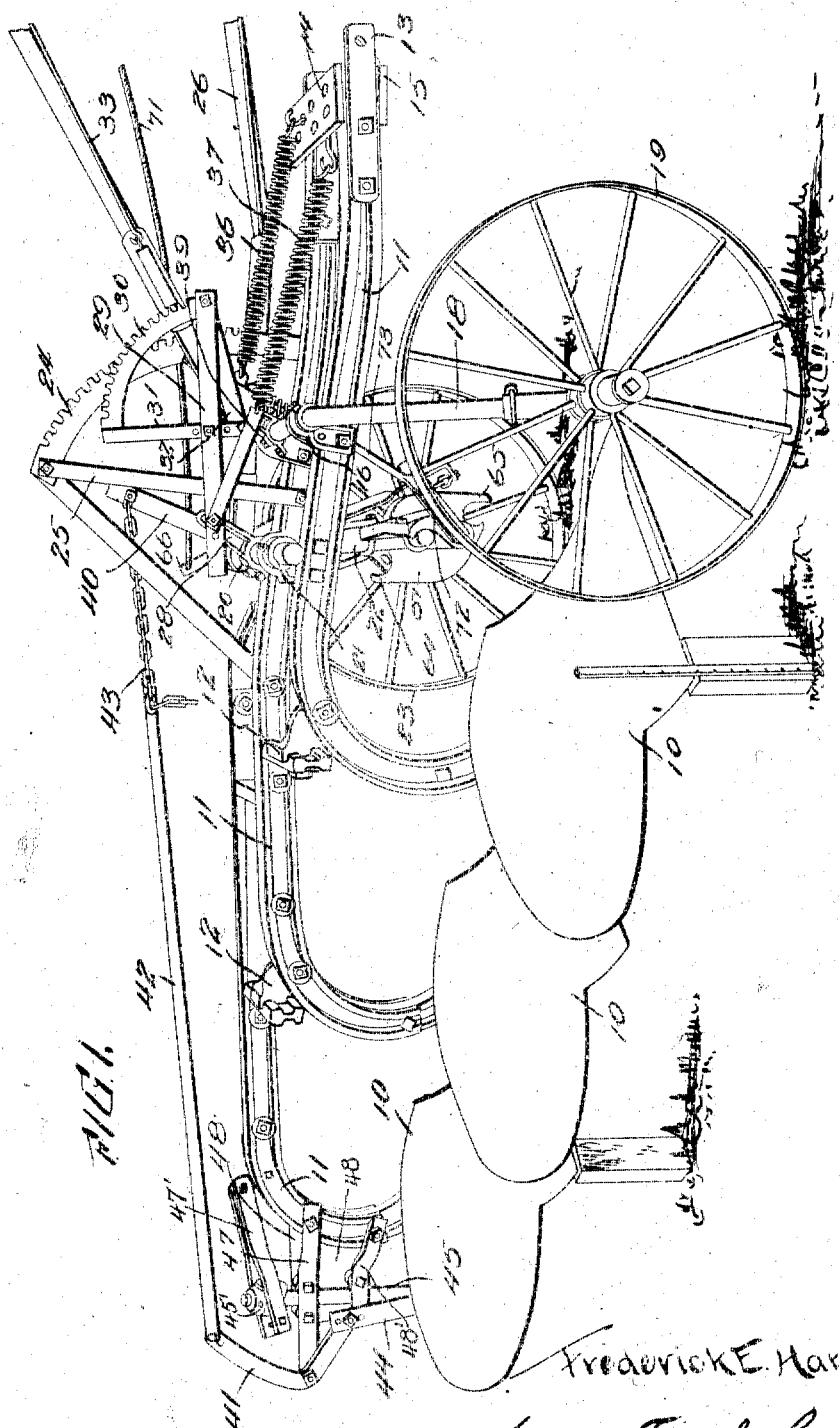

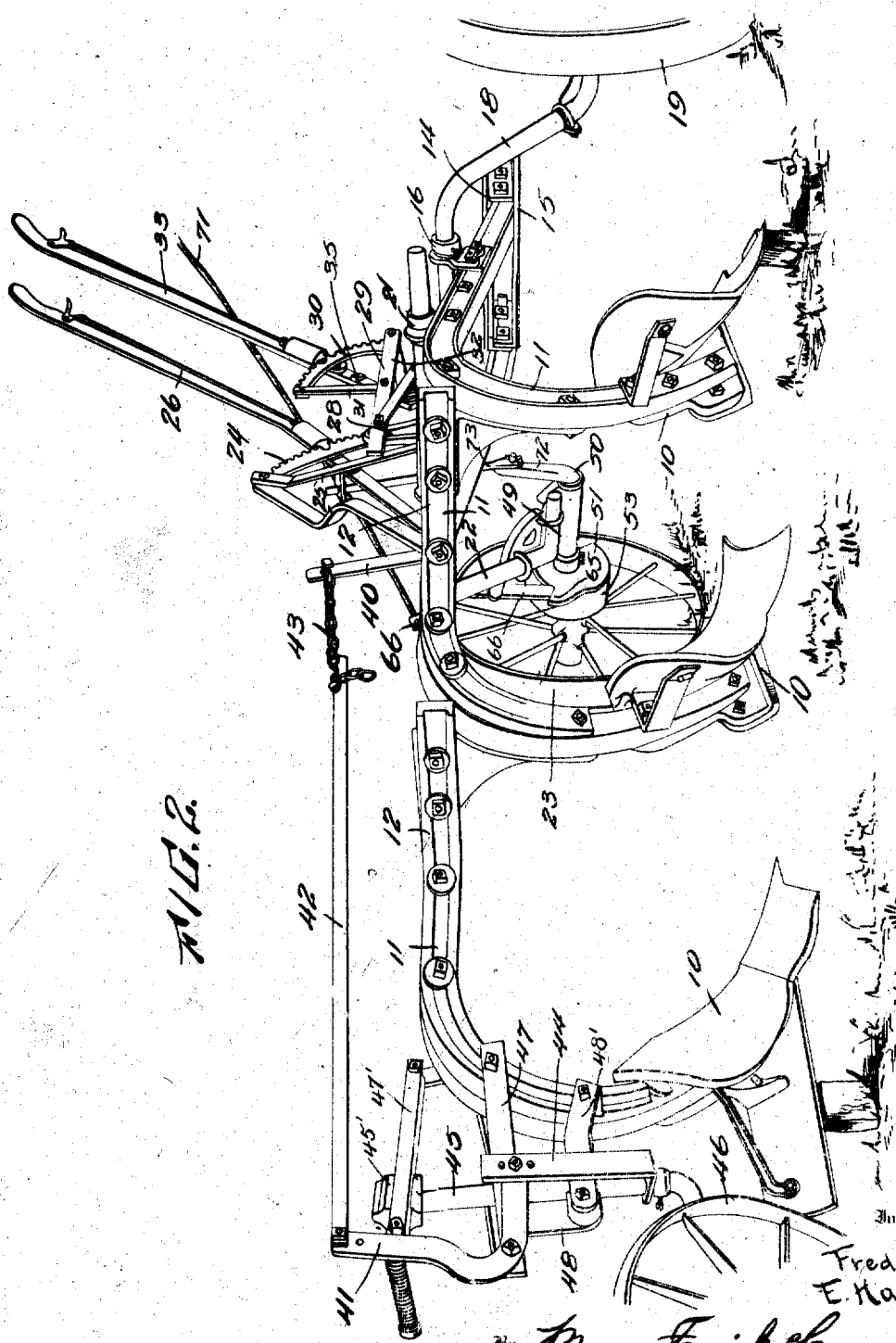

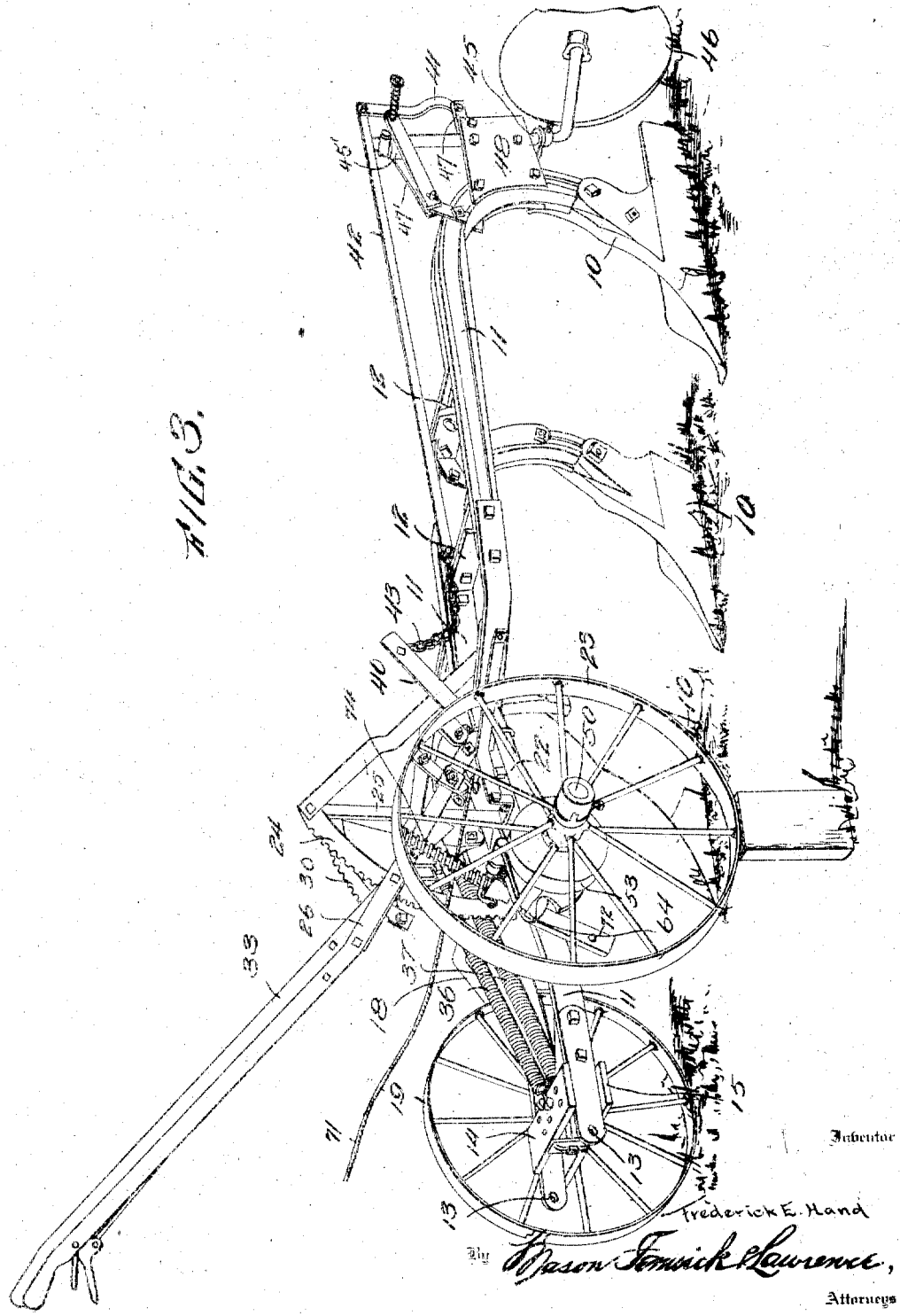

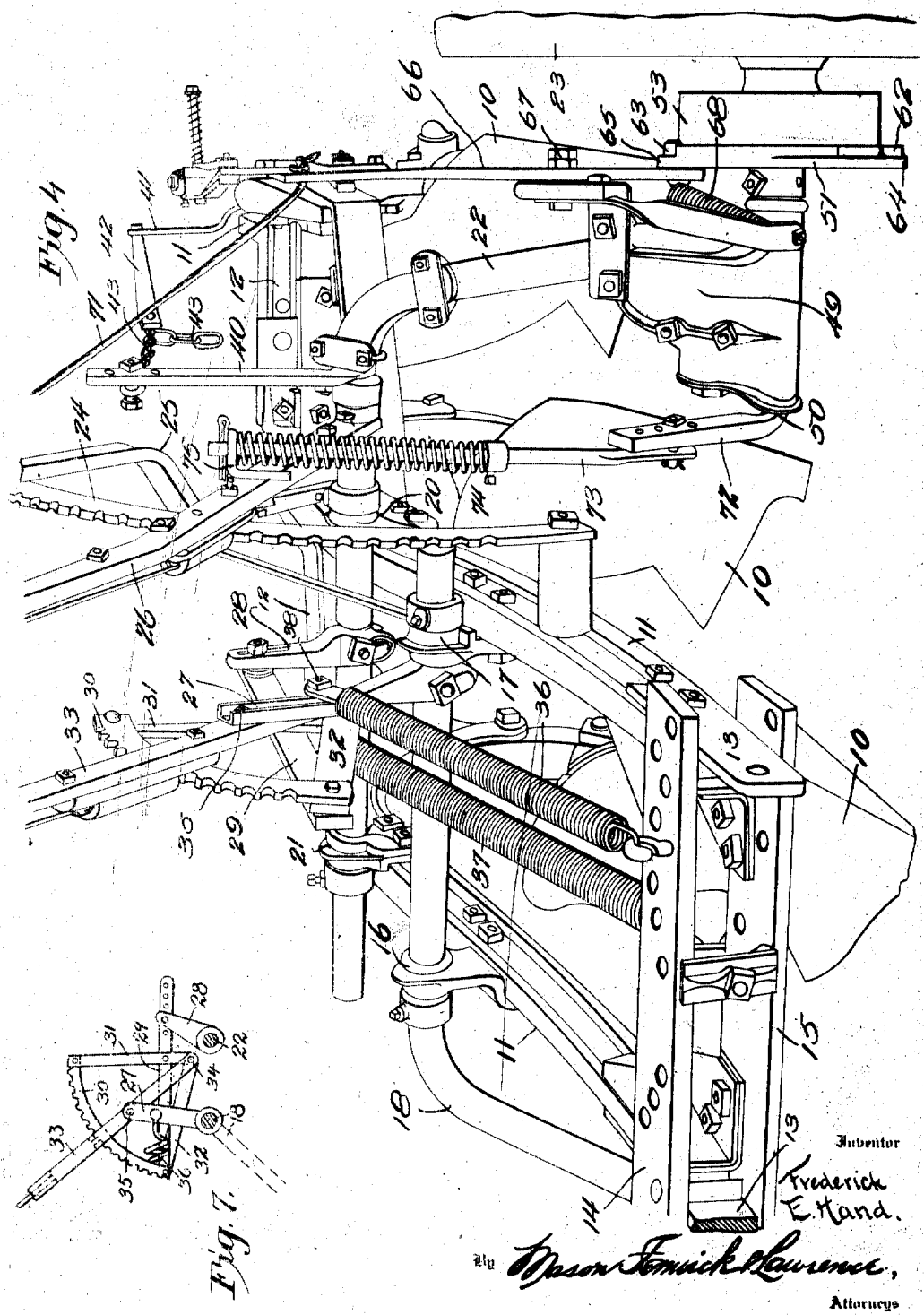

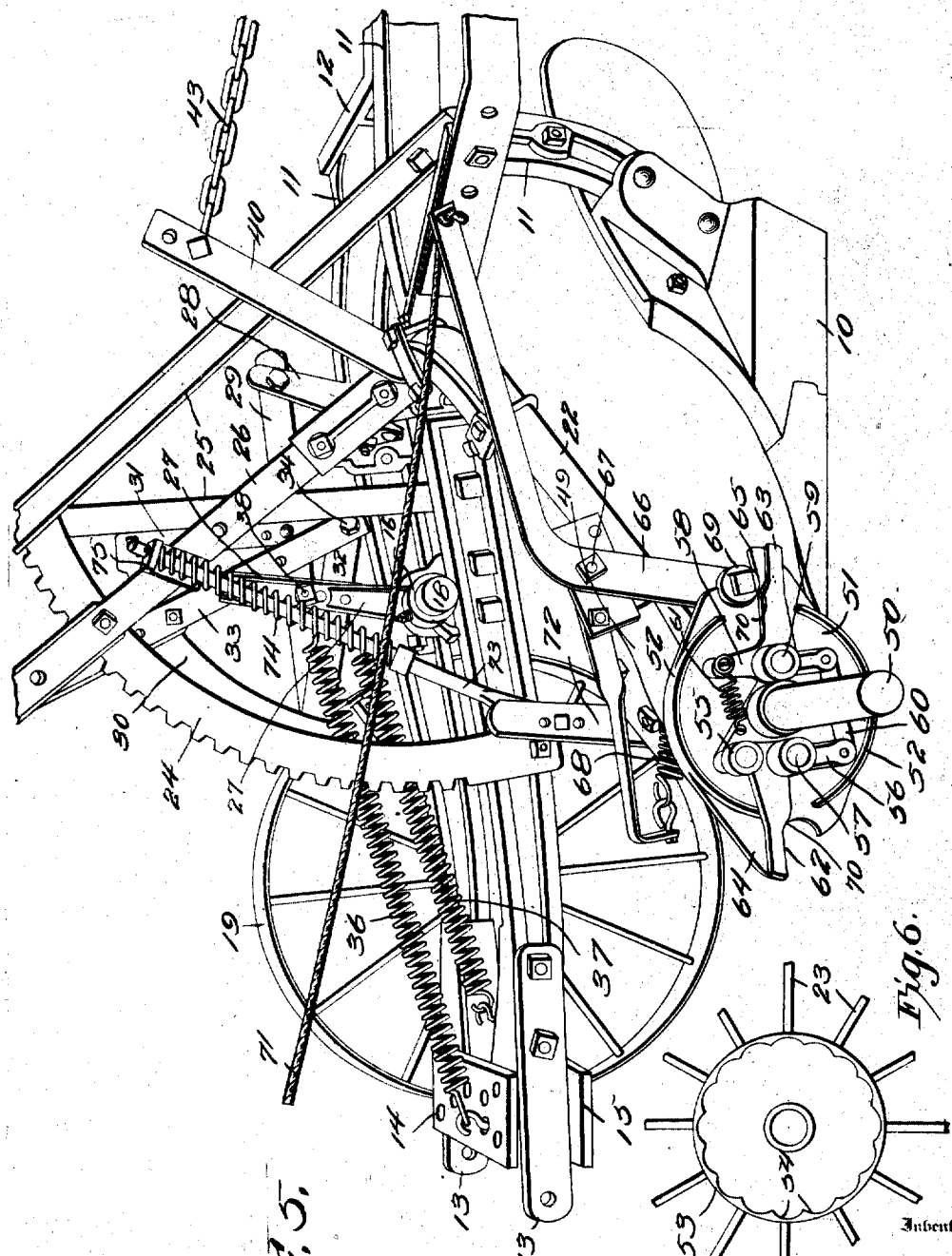

FREDERICK E. HAND, OF EVANSVILLE, INDIANA, ASSIGNOR TO THE VULCAN PLOW COMPANY, OF EVANSVILLE, INDIANA.

PLOW.

1,226,510.   Specification of Letters Patent.   Patented May 15, 1917.

Application filed November 17, 1915. Serial No. 62,021.

*To all whom it may concern:*

Be it known that I, FREDERICK E. HAND, a citizen of the United States, residing at Evansville, in the county of Vanderburg and State of Indiana, have invented certain new and useful Improvements in Plows; and I do hereby declare the following to be a full, clear, and exact description of the invention, such as will enable others skilled in the art to which it appertains to make and use the same.

This invention relates to plows, and has for an object to provide improved means for adjusting the depth of the furrow without interfering with the means for raising the plow out of the furrow.

A further object of the invention is to provide both manual and mechanical means for lifting the plow with adjusting means, so that when the plow is lowered it always cuts a certain depth of furrow without adjustment at each lowering.

A further object of the invention is to provide a new and improved power hoist for raising the plow with new and improved means for actuating from a point removed from the plow frame as, for instance, at a tractor located in front of the plow frame.

With these and other objects in view the invention consists in certain novel features of construction, combination and arrangement of parts as will be hereinafter more fully described and claimed.

In the drawings:—

Figure 1 is a perspective view of the improved plow seen from the furrow side.

Fig. 2 is a perspective view of the improved plow seen from the furrow side and in the rear of the plow.

Fig. 3 is a perspective view of the improved plow seen from the land side with the land wheel raised to plowing position.

Fig. 4 is an enlarged perspective view from the front showing the operating parts of the plow structure.

Fig. 5 is a perspective view from the land side showing the power hoist.

Fig. 6 is an elevation of the portion of a power hoist for the land wheel.

Fig. 7 is an elevation of an adjustable link connection controlled by one of the main levers.

Like characters of reference designate corresponding parts throughout the several views.

The improved plow which forms the subject-matter of this application is adapted to be used in conjunction with any approved or desired number of plow bottoms 10, carried upon beams 11, here shown as three in number, although it is to be understood that the number of plows carried upon the plow frame may be varied according to circumstances.

The several beams 11 are secured together adjustably by the braces 12 and are provided at their forward ends with ears 13 for attaching draft as, for instance, a tractor. A connecting structure composed of plates 14 and 15 is provided with a plurality of openings whereby the beams may be differently spaced to turn furrows of different widths.

Attached to the beams 11 are bearings 16 and 17 in which is journaled a bent axle 18 journaling the furrow wheel 19, while other bearings 20 and 21 journal a crank shaft 22 carrying the land wheel 23.

Rigidly secured to the frame composed of the beams 11 and their braces is a segment 24 properly and rigidly braced by the braces 25. The segment 24 is concentrically mounted relative to the portion of the crank 22 mounted in the bearings 20 and 21, and a lever 26 is pivoted upon the crank 22 and engages the segment 24 in the usual well-known manner so that as the lever 26 is manipulated the axle 22 is moved in its bearings to raise and lower the land wheel relative to the frame, or as the result would be to raise and lower the frame relative to the land wheel, the connection between the lever 26 and the crank 22 whereby this is accomplished being hereinafter fully described in connection with the power hoist of which the connecting elements form part.

The furrow wheel 19 is also arranged to be raised and lowered relative to the frame simultaneously with the raising and lowering of the land wheel, such connection being by means of a lever 27 rigidly connected with the axle 18 and operating by a variable link connection with the lever 28 rigidly mounted upon the crank 22. The variable link connection between the levers 27 and 28 comprises a bar 29 pivotally connected to the lever 28 and carrying a segment 30 rigidly secured to bar 29 by means of braces 31 and 32. A manual lever 33 is pivoted to the brace 32 at 34 and is also pivoted to the lever 27 at 35. It is obvious that by manipulating the lever 33 the relation of the levers 27 and 28 relative to each other will be changed so that when the lever 28 is actuated by the actuation of the lever 26 the lever 27 will also be actuated, but its position relative to the lever 28 may be changed manually as above described; and as the lever 27 controls the position of the furrow wheel it is obvious that by setting the lever 33 the relation between the furrow wheel and land wheel will be changed and that the operation of raising the plows out of the ground will not disturb such adjustment so that they may be raised and lowered without necessitating the readjustment when lowered to plowing position.

The construction just described is claimed in my divisional application 107,658, filed July 5, 1916.

To assist in the raising of the plows by the manipulation of the lever 26, or by the power hoist to be hereinafter described, springs 36 and 37 are employed—the spring 36 being pivotally connected to the lever 27 as at 38, while the spring 37 is connected with the lever 28 by means of the link 39. The springs 36 and 37 are connected to the draft plates 14 and 15 as shown more particularly at Fig. 4.

Also secured to the crank 22 is a lever 40 which is connected with the lever 41 through the medium of the link 42, means being provided as the chain 43 which permits a certain amount of independent motion of the lever 40 without affecting the lever 41. The lever 41 is connected by means of a link 44 with the caster standard 45 which journals the caster wheel 46. The caster parts are carried rigidly upon one of the beams 11 by the use of a frame including a plate 48, best shown in Fig. 3, and secured directly to beam 11 on one side thereof and secured to the other side of the beam by braces 47 and 48'. The rear end of brace 47 serves as a fulcrum for lever 41. The upper end of standard 45 enters block 45' which is retained in position by fork 47' shown in Fig. 3 and having its forward end secured to the beam.

In addition to the manual means for raising and lowering the plows relative to the wheel a power hoist is also provided comprising a bearing member 49 rigidly secured to the crank 22 and journaling a stub-axle 50 directly upon which the land wheel 23 is journaled. Member 22 is termed an axle for the reason that it has a relation to wheel 23 and the frame similar to that sustained by axle 18 to wheel 19 and the frame. The relation, however, is not identical, for member 50 operates in conjunction with axle 22 for supporting a wheel on that axle. Rigidly secured to the stub-axle 50 is a disk 51 having a flange 52 embracing the flange 53 carried by said land wheel 23. The interior of the flange 53 is provided with a plurality of scallops 54 and the roller 55 is carried by the disk 51 proportioned and positioned to engage in said scallops. The roller 55 is carried by a lever 56 pivoted at 57, and a similar lever 58 is pivoted at 59 diametrically opposite the lever 56 and connected thereto by means of the link 60. A spring 61 is provided connected preferably with the lever 58 and adapted to hold the roller 55 normally in engagement with the scallops 54. The levers 56 and 58 respectively carry arms 62 and 63. The disk 51 is also provided with ears 64 and 65 positioned adjacent the arms 62 and 63. A lever 66 is pivoted at 67 and a spring 68 is provided for controlling the lever 66 and holding such lever normally with the roller 69 carried thereby in engagement with one of the ears 64 or 65 of the disk 51. When the roller 69 engages one of the ears as 65, shown at Fig. 5, it slides into engagement with the cam face 70 of the lever 62 or 63 thereby extending the spring 61 and drawing the roller 55 out of engagement with the scallops 54 of the flange 53. When, however, the lever 66 is manipulated as, for instance, by the tightening of the cable 71, roller 69 is drawn out of engagement with the lever 63 and the ear 65, permitting the roller 55 to engage the scallops 54 and rotate the disk 51 and the stub-shaft 50 which is rigidly secured thereto. It will be noted that the stub-axle 50 is provided with an arm 72 which is connected by means of a link 73 with the lever 26, a spring 74 being employed engaging the bracket 75 through which the link 73 slides—the arm 72 and link 73 when in the position shown at Fig. 5 serving to connect the lever 26 with the stub-axle 50 and consequently with the crank 22 so that the crank 22 is raised and lowered by manipulating the lever. When, however, the stub-axle 50 is rotated by the engagement of the roller 55 with the scallops 54 of the flange 53 the arm 72 is rotated therewith, and the distance between the center of the stub-axle 50 and the lever 26 is shortened by the rotation of the arm 72 to the position shown at Fig. 3 wherein the arm 72 is then in its lowered position with the ear 64 of the disk 51 engaged by the roller 69 in which position the land wheel is raised or the plow frame is lowered to operative position, while in the position shown at Fig. 5 the land wheel is lowered, or conversely, the frame is raised out of operative position.

It is obvious that when the device is used in connection with a tractor the tractioneer may operate the cable 71 whereby the clutch is operated to permit one-half revolution of the disk 51, and that at the next half revolution the opposite ear 64 or 65 and consequently the lever 62 or 63 is engaged whereby the clutch is thrown out of operative position. It makes no difference whether the plow is up or down, a similar manipulation of the lever 66 through the medium of the cable 71 releases such clutch and permits a half revolution of the disk 51 to the opposite position. If, then, the plow is plowing the manipulation of the cable 71 will raise it out of plowing position, and if it is out of plowing position the manipulation of the cable 71 will lower it to plowing position.

At Figs. 1 and 2 the plow bottoms have been shown with a block supporting such plows, it being understood that the block is used only to more clearly illustrate in a perspective view the fact that the plows are raised above the surface of the ground; while at Fig. 3 the land wheel is shown with a block underneath, it being understood of course that this block is employed only to illustrate that the plow is in plowing condition with the plow bottoms and the furrow wheel 19 in position for the bottom of the furrow while the land wheel is in position to travel upon the top of the land.

In operation, the lever 26 is adjusted until the plows are running at the required depth, and so long as the plowing is to be continued at the uniform depth the lever 26 need not be further adjusted. At the end when the plow is to be turned the same may be accomplished by actuating the manual lever 26, which, through the medium of the link 73 and arm 72, causes the raising of the plow frame relative to the land wheel 23. If the plow is operated as from a tractor, however, it is not necessary to actuate the manual lever 26, but the same result is accomplished by actuating the cable 71 and the lever 66, causing the clutch to be actuated by the land wheel 23 as hereinbefore described to rotate the disk 51 and with it the arm 72 to lengthen the distance between the stub-axle 50 and the lever 26 whereby the same is accomplished.

When the plow is to be transported from field to field for instance, and it is desired to raise the plow still a greater distance above the ground, the power hoist and clutch may be actuated to throw the arm 72 upwardly as shown at Fig. 5 which raises the plows, and the manual lever 26 may be further actuated to raise the plows a still greater distance with the extremities of the axle 18 and crank 22 nearly vertical as shown at Fig. 1—the difference between the degree of lifting shown at Figs. 1 and 2 being that at Fig. 1 the plows are lifted to their extreme limit as indicated by the high block, while at Fig. 2 they are lifted only by the use of the power hoist as indicated by the short block.

The operation of the caster is substantially as follows: When the crank 22 is rocked to lower the axis of the wheel 23 and relatively raise the frame, the caster wheel 46 is simultaneously pressed downwardly by the forward pull of the link 42 through its chain 43 which is connected to the lever 40, this action rocking the lever 41 so that its horizontal arm is pressed downwardly, this relatively raising the rear end of the frame 11 during which action the stem 45 of the caster wheel slides down between the guides 48 and 48' and the link 47' swings on its pivotal connection with the rear end of the frame 11 carrying downwardly with it the swivel box 45 in which the upper end of the caster is mounted. Thus it will be noted that the caster wheel and the land and furrow wheels are simultaneously moved downwardly relative to the frame, or, conversely, the frame is moved upwardly from end to end when it is desired to raise the plows from plowing position.

What is claimed is:—

1. In a plow, a frame, a supporting wheel, a crank member having axial bearing on the frame, a hand lever having one end pivotally mounted on the upper horizontal part of the crank member, locking means for the hand lever, an axle for the wheel having rotatable connection with the lower end of the crank member on the frame and provided with a crank, means connecting the crank with the lever, a clutch device on the hub of the wheel, a complementary clutch device on the axle and connected thereby with the lever and means for effecting the engagement of the clutch devices.

2. In a plow, a frame, a supporting wheel, a crank member having axial bearing on the frame, a hand lever having one end pivotally connected to the upper horizontal portion of the crank member, a cranked stub-axle for the wheel having rotatable connection with the lower end of the crank member, yieldable means operatively connecting the crank of the axle with the lever, a clutch device on the hub of the wheel, a complementary clutch device on the axle and connected thereby with the lever and means for effecting the engagement of the clutch devices.

3. In a plow, a frame, a supporting wheel and axle therefor, means for connecting the wheel and axle at will, a hand lever and its lock, a crank member having axial bearings on the frame and with its upper horizontal portion having pivotal connection with one end of the lever, said connection being in substantial alinement with the bearings on the frame, and the axle having rotatable connection with the lower end of the crank member, a crank arm on one end of the axle, and means connecting the crank arm with the lever.

4. In a plow, a frame, a supporting wheel and axle therefor, a hand lever and its lock, a crank member having axial bearings on the frame, and with its upper horizontal portion having pivotal connection with one end of the lever, said connection being in substantial alinement with the bearings on the frame, and the axle having rotatable connection with the lower end of the crank member, a crank arm on one end of the axle, means connecting the crank arm with the lever, and clutch mechanism between the axle and wheel.

5. In a plow, a frame, a supporting wheel and axle therefor, a clutch for connecting the wheel and axle, a hand lever and its lock, a crank member having axial bearings on the frame, and with its upper horizontal portion having pivotal connection with one end of the lever, the axle having rotatable connection with the lower end of the crank member, a crank arm on one end of the axle, a link pivotally connected to the crank arm and slidably connected to the lever and a spring mounted on said link and reacting on the latter and the lever.

6. The combination with a plow embodying a frame, a plow bottom and a supporting wheel, of a crank having at its upper end a horizontal shaft on the frame, a stub-axle for said wheel carried parallelly and rotatably by the lower end of the crank and journaling the wheel thereon, a clutch to connect the stub-axle and wheel at will, manually controlled means on said crank-shaft controlling the clutch, a crank arm carried by the stub-axle, and a hand lever having pivotal connection with the upper horizontal portions of the crank and having spring controlled connection with the crank arm on the stub shaft.

In testimony whereof I affix my signature in presence of two witnesses.

FREDERICK E. HAND.

Witnesses:
JOHN H. BERRYHILL,
LESLIE A. THOMAS.